United States Patent [19]

Jourdan

[11] Patent Number: 4,628,689
[45] Date of Patent: Dec. 16, 1986

[54] INTERNAL COMBUSTION ENGINE EXHAUST SYSTEM

[76] Inventor: Charles Jourdan, "Mona Lisa" Residence, 52 Boulevard Berthie-Albrecht, Sainte-Maxime (Var), France

[21] Appl. No.: 641,438

[22] Filed: Aug. 16, 1984

[30] Foreign Application Priority Data

Aug. 18, 1983 [FR] France .................. 83 13686

[51] Int. Cl.[4] ................... F01N 7/08; F01N 7/18; F01N 3/02
[52] U.S. Cl. ..................... 60/295; 55/276; 55/359; 55/419; 55/444; 55/DIG. 30; 60/299; 60/311; 181/257; 181/270; 422/177
[58] Field of Search ............. 60/295, 311, 299, 297; 181/251, 257, 268, 270, 275; 422/177; 55/DIG. 30, 484, 276, 359, 343, 444, 419, 481

[56] References Cited

U.S. PATENT DOCUMENTS

| 1,867,325 | 7/1932 | Neville ............................. 55/481 |
| 2,737,260 | 3/1956 | Jenison ...................... 55/DIG. 30 |
| 3,224,171 | 12/1965 | Bowman ................... 55/DIG. 30 |
| 3,771,315 | 11/1973 | Scott ........................... 55/DIG. 30 |

FOREIGN PATENT DOCUMENTS

| 1113119 | 7/1959 | Fed. Rep. of Germany . |
| 148607 | 11/1981 | Japan ......................... 55/DIG. 30 |
| 360540 | 11/1931 | United Kingdom . |

*Primary Examiner*—Douglas Hart
*Attorney, Agent, or Firm*—Karl F. Ross; Herbert Dubno

[57] ABSTRACT

An exhaust system for the internal combustion engine of an automotive vehicle comprises a diecast housing of an aluminum-magnesium-silicon alloy in the form of a boxlike housing part provided with a removable cover affording access to a replaceable rectangular parallelepipedal filter cartridge which separates the housing into an intake chamber and a discharge chamber respectively connected to an expansion chamber and the tail pipe.

14 Claims, 8 Drawing Figures

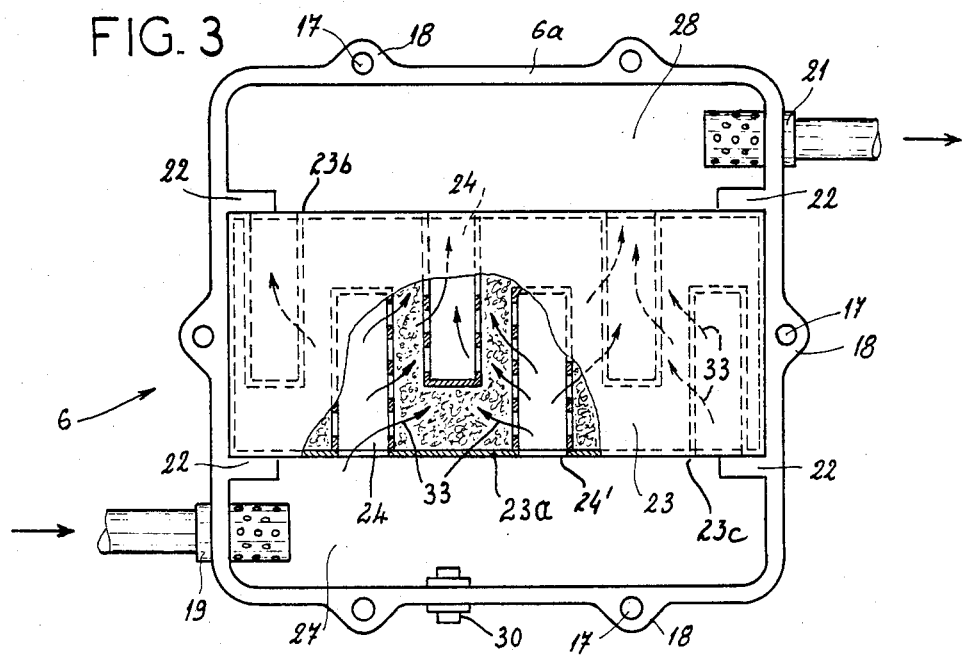
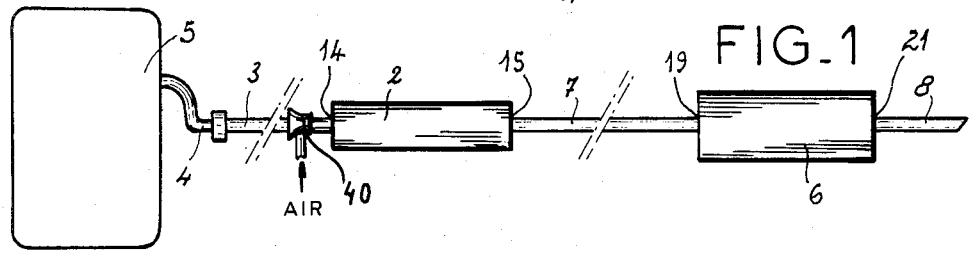
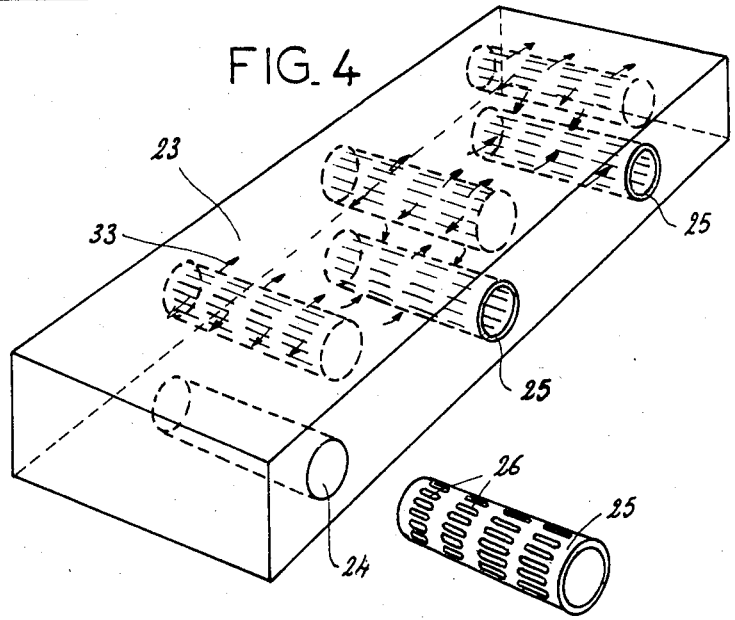

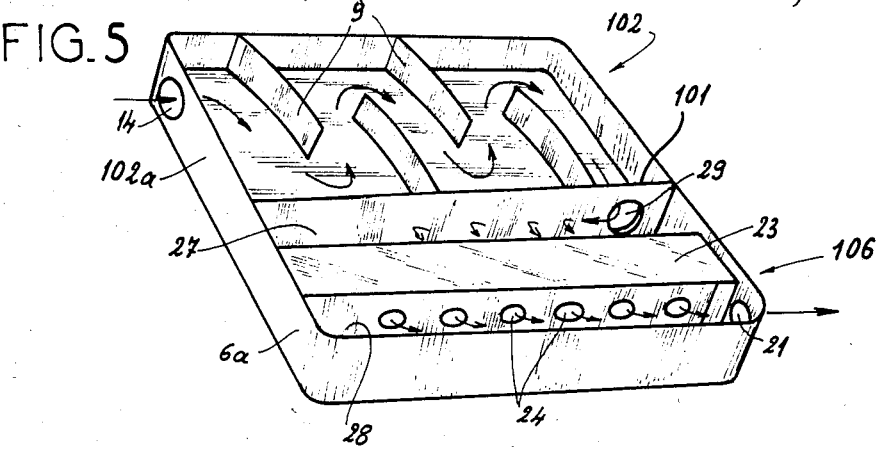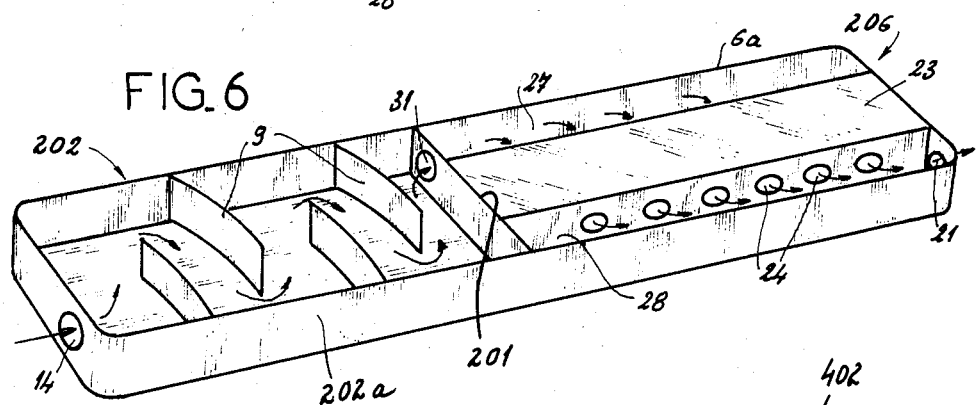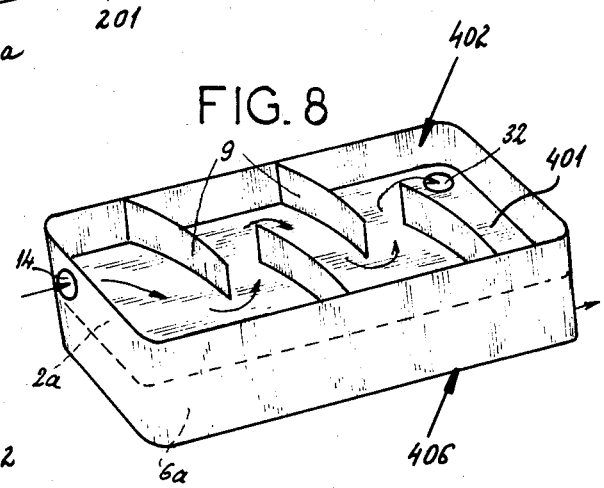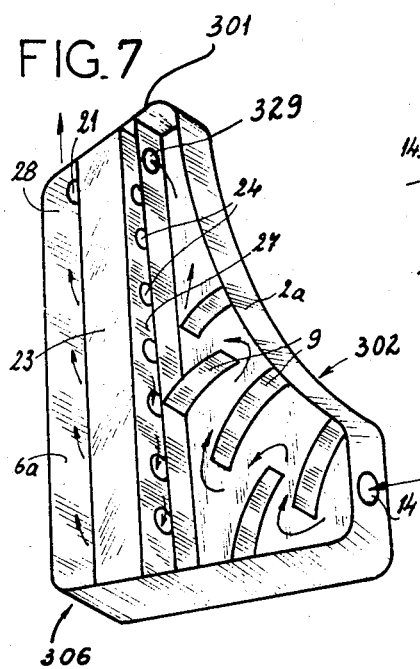

INTERNAL COMBUSTION ENGINE EXHAUST SYSTEM

FIELD OF THE INVENTION

My present invention relates to an exhaust system for an internal combustion engine and, more particularly, to mufflers and muffler systems for the acoustic damping of the exhaust of an internal combustion engine, such as the internal combustion engine of a motor vehicle.

BACKGROUND OF THE INVENTION

Generally the exhaust systems of internal combustion engines particularly of motor vehicles have hitherto comprised the exhaust manifold which collects the exhaust gases from the cylinders of the engine, a muffler forming an acoustic damping device connected to this manifold, e.g. via an exhaust pipe, and a tail pipe connected to the muffler and discharging the exhaust gases into the atmosphere.

The muffler may be provided with a tubular housing which can have inlet and outlet fittings connected respectively to a casing or chamber which can be referred to as the expansion chamber and to the tail pipe opening rearwardly of the vehicle. In such systems, therefore, two housings were provided, one for the expansion chamber and the other containing the sound damping means, the two housings being spaced apart in the direction of flow of the exhaust gas.

The expansion chamber has as its principal function, reduction in the energy of the outflowing exhaust gas. This is done by creating in the exhaust gas vortices or turbulence generally by baffling the flow back and forth. The muffler or sound-damping unit is intended to reduce the acoustic output which results upon the discharge of the engine gas to the atmosphere.

A tubular muffler may contain a filtering body which is permeable to the exhaust gas and through which the exhaust gas passes.

The filtering body may be composed of rock wool. The elements of the exhaust system are suspended, e.g. by yieldable elements, on the underside of the chassis of the vehicle. The pipes are composed of steel and the casings, which generally are cylindrical, are also composed of steel sheet assembled by soldering or welding and/or by rivets.

The vibration acting upon these elements of the exhaust system cooperates with the corrosive effect of the combustion gases and condensate therefrom to cause more or less rapid deterioration of the parts of the exhaust system so that the latter require frequent changing. This, of course, results in a considerable increase in the cost of maintaining an automatic vehicle. In addition, because these elements project from the bottom of the vehicle, they are subject to road hazards and hence mechanical damage.

In the British Pat. No. 360,540 and the German Pat. No. 1,113,119, there are described exhaust systems which are intended to eliminate these drawbacks. In these systems, the two housings are composed of a molded material resistant to corrosion by the exhaust gases, each housing being equipped with a removable cover enabling access to the interior and attached to the body of the housing by appropriate means. The "molding" was generally a "die casting".

In these systems, the two housings were far more durable than the earlier systems, could have any desired configuration and could conform to recesses or the like in the lower part of the chassis of the vehicle so that they could be located at greater distances from the ground and, in general, in positions less vulnerable to road hazards or the like. The baffles of the first or expansion chamber were generally molded in place with the remainder of the body and thus had unchangeable positions and fixed effects upon the gas.

OBJECTS OF THE INVENTION

It is the principal object of the present invention to provide an improved exhaust system of the latter type, i.e. to advance the principles described in these patent documents and most specifically to improve upon the muffler portion of the exhaust system.

Another object of this invention is to provide an improved muffler for an exhaust system whereby some of the drawbacks enumerated above are obviated.

It is also an object of this invention to provide an improved exhaust system which is less affected by corrosion phenomena than earlier systems, is of relatively simple and inexpensive construction, and has a shape more suited to a position under the chassis of an automotive vehicle.

SUMMARY OF THE INVENTION

These objects are attained, in accordance with the present invention, in an exhaust system of the type in which an expansion chamber is provided between the sound damping chamber and the exhaust manifold of the engine and the two chambers are connected by an exhaust pipe, and a tail pipe or the like vents the said damping chamber to the atmosphere.

According to the invention, at least the sound damping chamber is composed of a molded material resistant to corrosion by the exhaust gas and to elevated temperatures and comprises a casing body open along a side and a cover which can be affixed to the casing body along this side to close the latter. The cover is affixed by any convenient means to enable it to be removed and the interior of the casing is divided into three zones, a central zone receiving an interchangeable or replaceable cartridge of filtering material, e.g. rock wool and two lateral zones communicating with respective fittings and forming resonating compartments flanking the body of filtering materials and interconnected thereby, the fittings respectively connecting one of these compartments to the expansion chamber and the other of these compartments to the tail pipe. The muffler body is thus diecast as a nondeformable structure and has a removable cover to allow access for replacement to the preformed filter cartridge.

The filter cartridge is constituted of a body of filter material having passages opening at one side and terminating short of the other side, the passages from each side being interspaced and the two sides of the passages delimiting respectively the inlet and outlet resonating compartments which flank the cartridge. The replaceable cartridge is preferably constituted by a block of rock wool or of aluminum fibers received in a thin wall housing or container which is provided with openings from which liners for the passages in the body extend inwardly, the liners being, in turn, cylindrical walls which are perforated.

When the filter body becomes permeated by zinc carbonate or other materials, the cover is simply removed and the preformed body of filter material is replaced.

According to a feature of the invention, the mass of material in the replaceable filter cartridge is permeated with a combustion catalyst such as platinum sponge and platinum black which assures the burning of combustibles contained in the exhaust gas and hence a reduction in environmental pollution. This combustion can be carried out without a foreign energy source and without contributing calories to the reaction.

The passage liners can each extend into the filter body from respective sides thereof by a distance slightly less than the width of the filter cartridge as measured between these sides. This ensures that the gas flows from the inlet compartment to the outlet compartment will always traverse the filter material, come into contact with the catalyst, and thus combustibles thereof can be eliminated before the gas is released into the atmosphere. The passages can lie in the same plane or can be staggered in different planes.

The most preferred filter mass is a mass consisting of aluminum fibers which has been impregnated with platinum black. According to another feature of the invention, the muffler is provided with a fresh-air inlet which supplies at least a part of the air required to support catalytic combustion of the combustibles and reduces the temperature of the gas as it traverses the filter. This air inlet is preferably provided ahead of the first or expansion chamber and can utilize the Venturi principle.

BRIEF DESCRIPTION OF THE DRAWING

The above and other objects, features and advantages of the present invention will become more readily apparent from the following description, reference being made to the accompanying drawing in which:

FIG. 1 is a diagram of an exhaust system amplifying the present invention;

FIG. 3 is a plan view from below, partly broken away and with the cover removed illustrating an embodiment of the invention;

FIG. 4 is a perspective view of the filter cartridge used in FIG. 3; and

FIGS. 5 through 8 are perspective views in highly diagrammatic form and with the covers removed of an exhaust system in which the muffler is provided in the same housings with the expansion chamber.

SPECIFIC DESCRIPTION

Figure 2:
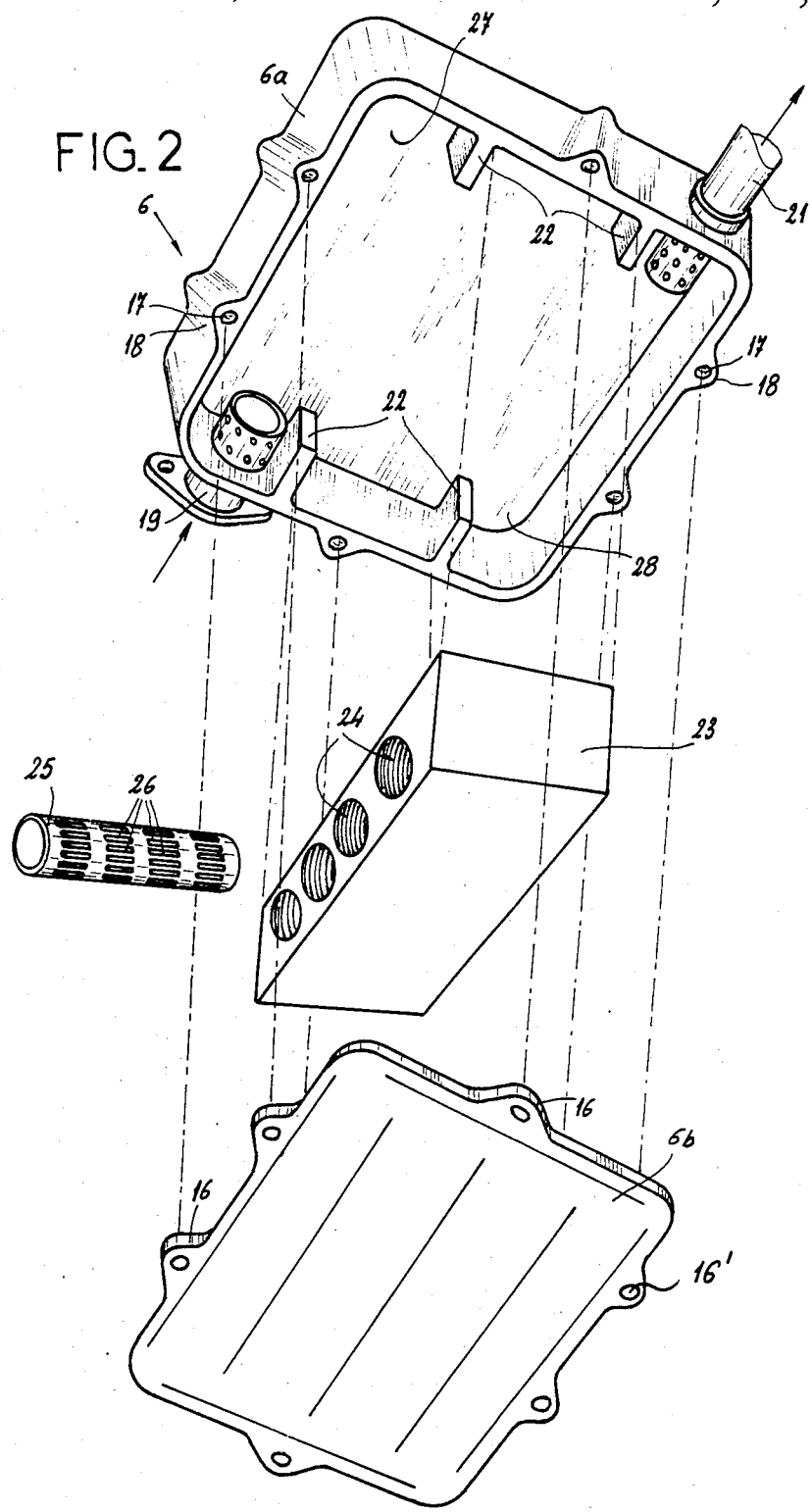
FIG. 2 is an exploded perspective view of the muffler thereof.

From FIG. 1 it will be seen that the exhaust system of the invention can comprise an expansion chamber 2 which is provided with inlet and outlet fittings 14 and 15 connected respectively to exhaust pipes 3 and 7. The exhaust pipe 3 can be provided with an air inlet 40 in the form of a Venturi nozzle which sucks air into the exhaust gas mixture before it enters the expansion chamber 4. The exhaust pipe 3 is connected to the exhaust manifold 4 of an internal combustion engine 5 while the exhaust pipe 7 is connected to an inlet fitting 19 of a muffler 6 which has an outlet 21 connected to a tail pipe 8. The muffler and expansion chamber in FIG. 1 have both been shown diagrammatically and will generally have the configurations of FIGS. 2, 3 or 5 through 8. As can be seen from FIG. 2, the muffler 6 comprises a housing body 6a and a cover 6b formed by die casting from a material resistant to corrosive effect of the exhaust gas and to the temperature of the latter and having good acoustic damping properties of its own. Best results are obtained with aluminum, magnesium and silicon alloys and especially the alloys of aluminum, magnesium and silicon. The cover 6b is provided with eyes 16 traversed by bore 16' through which screws (not shown) forming part of the mounting means can be passed to engage in threaded bores 17 formed in external bosses 18 molded with the lateral walls and the end walls of the body 6a. The housing 6a, 6b thus has the general configuration of a rectangular parallelepiped.

Each of the end walls of the body 6a is provided with a fitting, namely, the inlet fitting 19 adapted to be connected to the exhaust pipe 7 and an outlet fitting 21 adapted to be connected to a tail pipe 8 which discharges the exhaust gas into the atmosphere.

From FIG. 2 it will also be apparent that the end walls of the body 6a are formed unitarily with respective spaced-apart inwardly extending lugs 22 between which the sound damping cartridge 23 can be received.

As will be apparent from FIGS. 2 through 4, when the cartridge 23 is inserted between the lugs of each pair, the cartridge defines within the housing a pair of compartments or lateral zones 27 and 28 communicating with the inlet fitting 19 and the outlet fitting 21.

Apart from serving respectively as a gas distributor and a gas collector, compartments 27 and 28 form resonators.

The filter cartridge 23 is advantageously in the form of a rectangular parallelepiped and composed of a block of rock wool or aluminum fibers received in a thin-walled parallelepipedal shell 23a which maintains the form and dimensions of the filter body, enables it to be inserted and removed from between the lugs 22 and defines openings 24' along the opposite longitudinal edges 23b and 23c of the shell 23a. These openings are extended into transverse passages 24 which extend only part of the width of the filter body, the passages from opposite sides alternating with one another and being interspaced.

All of the passages 24 are provided with cylindrical liners 25 having longitudinal openings 26 which permit the gas to enter and leave the filter body as represented by the arrows and thus enable the filter body to damp the noise.

The ability to simply remove and replace the cover permits frequent replacement of the interchangeable cartridge 23 so that the muffler has an overall life far in excess of that of conventional mufflers and operates with especially high efficiency over far greater time spans than earlier mufflers. The cartridge not only serves as a sound attenuator but also acts as a trap to collect noxious and toxic ingredients which might otherwise be released into the atmosphere. When blockage occurs, the filter cartridges simply are replaced. The housing construction has been found to be less susceptible to damage than earlier exhaust system mufflers.

From FIG. 3 it will be apparent that the muffler is generally similar to that of FIG. 1 in which the cartridge is able to subdivide the interior into three zones including the two lateral zones or compartments and the central zone or compartment receiving the cartridge. The sound damping material contained in the cartridge is impregnated with a catalyst promoting combustion of the combustibles contained in the exhaust gas before the exhaust gas is discharged into the atmosphere.

In the embodiments illustrated in FIGS. 3 and 4, moreover, all of the passages 24 are disposed in a common plane. The length of each passage is most advantageously about two-thirds the width of the cartridge. The arrows 33 show the flow of the gas through the cartridge and indicate that there is interior contact between the gas and the material of the cartridge, such that the catalytic reaction is promoted. An additional fresh-air inlet as illustrated at 40 can be provided, preferably proximal to the inlet fitting 19 so that the air is drawn into the device by the Venturi principle. The fresh air mixes with the exhaust gas to reduce its temperature and contributes its oxygen to the catalytic combustion reaction.

The cartridge 23, utilizing aluminum fibers impregnated with platinum black, cannot be used effectively in a vehicle operated with leaded gasoline because of the potential danger of catalyst poisoning.

While in the embodiments of FIGS. 1 through 4, the muffler is formed independently of the expansion chamber 2 and is connected thereto by an exhaust pipe 7, FIGS. 5 through 8 illustrate diagrammatically how this exhaust pipe can be eliminated.

In FIG. 5, for example, the body is divided into two chambers 102 and 106 forming respectively the expansion chamber and the muffler and these chambers are interconnected by a hole 29 in a partition 101 between the two chambers 102 and 106. The cover may be applied to the body 102a in the manner described with respect to FIGS. 1 through 4 and the same effect in attaching the cover may be applied to FIGS. 6 through 10. In this case, the number of fittings is markedly reduced since fittings are only required at 14 and 21 for connection to the exhaust pipe. The veins or baffles 9 are here molded directly with the body 102a in the expansion chamber. All other reference numerals in FIG. 5 and except as described here below in FIGS. 6 through 8, identify structure identical to that described in connection with FIGS. 1 through 4 utilizing these reference numerals.

In the embodiment of FIG. 6, the housing body 202a and the muffler 206 are disposed end to end so that the partition 201 between the chambers lies transversely to the length of the cartridge. This partition is formed with an orifice 31 connecting the two chambers 202 and 206.

FIG. 7 illustrates an embodiment generally similar to that of FIG. 6 but with a slightly different shape and in this embodiment the muffler 306 and the expansion chamber 302 are separated by a long wall 301 provided with the orifice 329. The cover, when applied in the embodiments of FIGS. 5 through 7, of course, can be a single piece closing both chambers.

As shown diagrammatically in FIG. 8, the expansion chamber 402 and the muffler 406 on opposite sides of common housing can be closed by respective covers (not shown) and communicate via a hole 32 in a horizontal partition 401 separating the two chambers. In the orientation illustrated, the removal of the cover from below the device allows access from below to the cartridge for its replacement.

I claim:

1. A muffler for an exhaust system of an internal combustion engine, the muffler comprising:
 a molded housing body open along one side and a cover removably attached to said housing body, said cover and said housing body together defining a hollow housing composed of a material resistant to corrosion by exhaust gas and to elevated temperatures;
 an inlet communicating with the interior of said housing and an outlet communicating with the interior of said housing;
 formations in the housing body defining between the inlet and the outlet a seat;
 a filter cartridge replaceably received in the seat of said housing and defining in the interior thereof an inlet compartment communicating with said inlet and an outlet compartment communicating with said outlet, said filter cartridge having a rigid thin shell and a permeable mass generally filling the shell and formed with passages communicating with said compartments at said sides for the acoustic damping of the exhaust gas, some of said passages opening only into one of the compartments and the other passages opening only into the other compartment; and
 means for securing said cover over the open side of said housing and thereby laterally closing said compartments with the cover and holding the cartridge in the seat to subdivide the inlet compartment from the outlet compartment with the cartridge so that flow between them is only possible through said passages and through the material in said cartridge.

2. The muffler defined in claim 1 wherein each of said passages is lined with a perforated metal tube.

3. The muffler defined in claim 2 wherein said filter material is impregnated with a combustion catalyst for burning combustibles in an exhaust gas traversing said cartridge.

4. The muffler defined in claim 3 wherein the passages at one side of said cartridge are spaced apart by greater distances than each passages is spaced from a passage from the other side of the cartridge.

5. The muffler defined in claim 3 wherein said passages are disposed in a common plane.

6. The muffler defined in claim 3 wherein said passages extend alternately into said cartridge from opposite sides and the passages of opposite sides of said cartridges are interspaced with one another.

7. The muffler defined in claim 3 wherein said catalyst is platinum sponge or platinum black.

8. The muffler defined in claim 7 wherein said catalyst is rock wool impregnated with platinum sponge.

9. The muffler defined in claim 7 wherein the filter material is a body of aluminum fiber impregnated with platinum black.

10. The muffler defined in claim 3, further comprising means upstream of said cartridge for admitting fresh air to the material traversing said cartridge.

11. The muffler defined in claim 10 wherein the means for admitting fresh air includes an air inlet in a wall of said housing.

12. The muffler defined in claim 10 wherein said inlet is connected to an expansion chamber and said means for admitting fresh air includes means for inducing fresh air into exhaust gas upstream of said expansion chamber.

13. The muffler defined in claim 10 wherein the last mentioned means includes a Venturi intake for the fresh air.

14. The muffler defined in claim 1, further comprising means forming an expansion chamber in said housing.

* * * * *